United States Patent [19]

Nemoto et al.

[11] 4,143,957
[45] Mar. 13, 1979

[54] CONTROL DEVICE OF SHUTTER FOR CAMERA

[75] Inventors: Ichiro Nemoto; Tadashi Nakagawa; Masanori Watanabe; Mitsuo Koyama; Eiichi Onda, all of Chiba, Japan

[73] Assignee: Seiko Koki Kabushiki Kaisha, Japan

[21] Appl. No.: 744,759

[22] Filed: Nov. 24, 1976

[30] Foreign Application Priority Data

Nov. 25, 1975 [JP] Japan ............................. 50-140959
Nov. 25, 1975 [JP] Japan ............................. 50-140960

[51] Int. Cl.² .......................... G03B 9/08; G03B 9/62
[52] U.S. Cl. .................................. 354/266; 354/226; 354/234
[58] Field of Search ............ 354/226, 266, 202, 234, 354/235, 250

[56] References Cited

U.S. PATENT DOCUMENTS

| 3,162,110 | 12/1964 | Miessen | 354/266 |
| 3,798,671 | 3/1974 | Ishida | 354/226 |
| 4,051,499 | 9/1977 | Kondo | 354/234 |
| 4,060,313 | 11/1977 | Kondo | 354/234 X |

Primary Examiner—Michael L. Gellner
Attorney, Agent, or Firm—Robert E. Burns; Emmanuel J. Lobato; Bruce L. Adams

[57] ABSTRACT

A camera shutter includes a pair of spaced apart base plates supporting the various shutter components. At least one of the base plates is formed entirely of synthetic resin material which is electrically insulative and which possesses lubricating properties. The synthetic resin base plate has a set of tubular portions extending toward and connected to the other base plate and also has a set of shafts turnably supporting some of the shutter components, such as the control lever and control cam. The synthetic resin base plate also includes a hollow winding frame about which is wound a coil and in which is slidably inserted an armature to form an electromagnet for use in controlling the shutter operation. The use of a synthetic resin base plate dispenses with the necessity of separate lubrication and enables formation of a smaller shutter.

10 Claims, 2 Drawing Figures

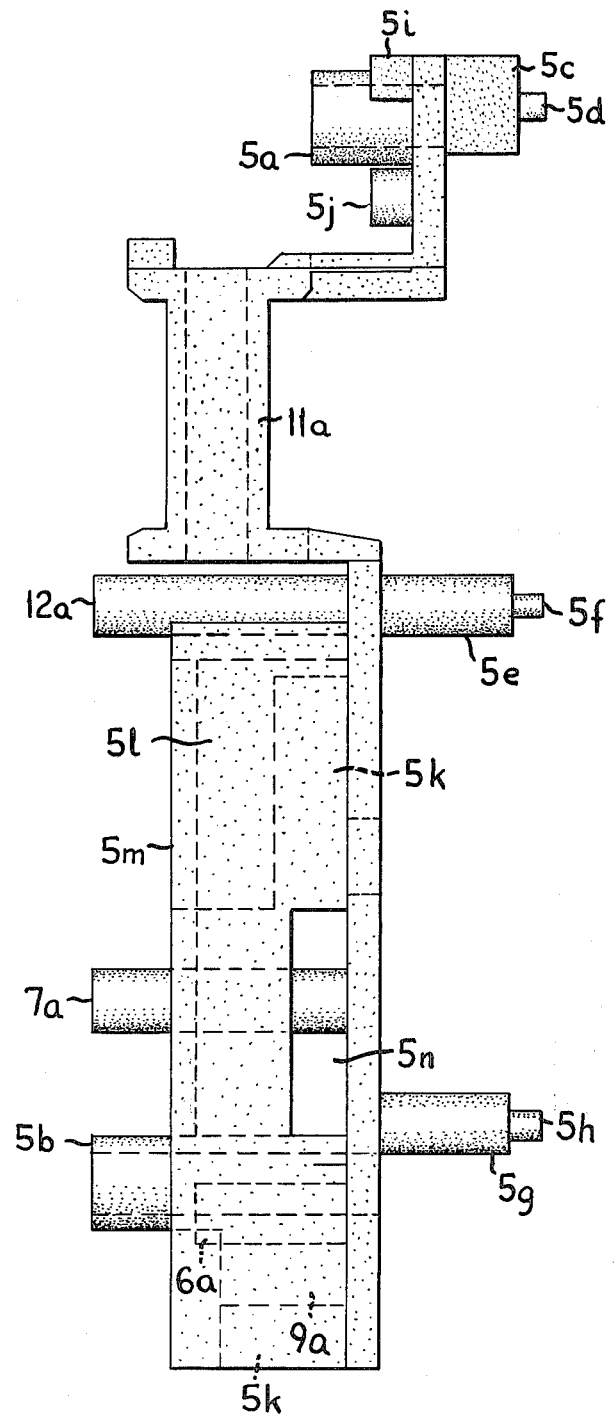

CONTROL DEVICE OF SHUTTER FOR CAMERA

BACKGROUND OF THE INVENTION

This invention relates to a control device for a camera shutter. The usual technique of releasing consecutively the opening and closing members for effecting the exposure operation of a shutter involves, in general, a control using a conventional mechanical delay mechanism as well as a control using an electromagnet connected with an electronic delay circuit.

Although the latter system can be simplified from the standpoint of the mechanism, its structure is rather complicated because there are several problems to be solved with regard to electrical insulation, connection of the electromagnet, etc. in obtaining the necessary coaction between electrical or mechanical signals.

One object of this invention is to improve the latter system, which is superior in exposure time precision and also has a higher performance reliability in the case of repeating operations, by its further simplification so as to make it inexpensive to manufacture as well as suitable for use in any small-size camera.

There are two types, in general, of focal-plane shutter for camera, which carry out exposure control through consecutive releases of said opening and closing members:

The first type in which the first and second blinds made of a cloth travel in the horizontal direction of the camera and the second type in which the blinds made of a cloth or metallic sheet travel in the vertical direction of the camera.

In the second type of shutter, a control mechanism for controlling the first and second blinds is arranged on one side in the horizontal direction of the camera and therefore some horizontal deviation in lens arrangement is inevitable for composing the shutter into a camera to form an obstacle from the stand-point of convenient operation if a small-size camera is to be designed, so that it is desired to reduce the space where said control mechanism is arranged.

On the other hand, said first type of shutter makes it possible to arrange a control mechanism in the vertical direction of the camera, resulting in few obstacles as mentioned above but it is disadvantageous, in comparison with said second type, from the standpoint of productivity, performance, etc.

Another object of this invention is to reduce the size of said control mechanism so that the shutter can be adapted to a small-size camera.

Said first object can be attained if, in connection with the shutter release, a contact for initiating operation of an electronic circuit for exposure control and the winding of an electromagnet for exposure control are insulated from the body of the camera and at the same time, for improving the performance of said electromagnet and simplification of connecting means, a fitting base plate for arranging the control mechanism is provided with a contact support, a winding frame of said electromagnet and a supporting shaft for each operating member are formed in one body from synthetic resin.

Such a base plate like this makes it possible to reduce the size of a simplified and less expensive shutter.

Said second object can be attained if as a member having multiple functions, a base plate arranged and supporting the control mechanism is formed in one body out of synthetic resin and as a result, it becomes possible to realize such a function and reduction in size which have not heretofore been possible with any conventional metallic plate.

Referring now to the drawings, one embodiment of the present invention is described in detail in the following.

BRIEF DESCRIPTION OF THE DRAWINGS

FIG. 2 is a partial view of the right side of the base plate shown in FIG. 1.

DETAILED DESCRIPTION OF THE INVENTION

Figure 1:
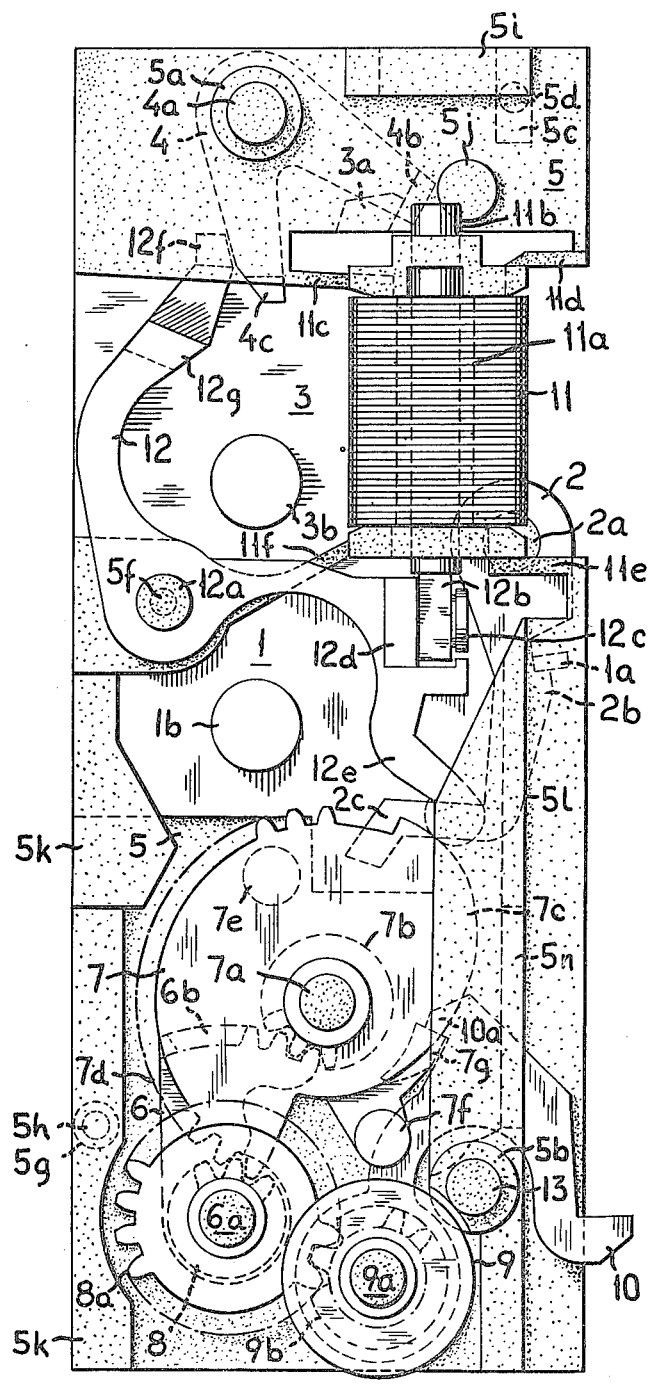
FIG. 1 is a plan view showing a shutter of the present invention in its charged condition.

In FIG. 1, an opening blade for starting an exposure and closing blade for completing the exposure are pivoted on a first base plate provided with an opening for film exposure, said blades being omitted in order to simplify the drawing.

With its only partially illustrated bent portion 1a, an opening member 1 for operating said opening blade is rotatably supported on said base plate and biased into the position shown by a right-turning spring (not shown).

A hook member 2 engages with said opening member 1, locks said bent portion 1a of said member 1. The hook member 2 is rotatably supported on said base plate by a shaft 2a and locks said bent portion 1a with its hook portion 2b. The hook member has an operating portion 2c which extends downward to the left and is pressed or urged into the position shown by a left-turning spring (not shown).

A closing member 3 for operating said closing blades is partially illustrated through a locking arm 3a and is rotatably supported on said base plate by a shaft 3b and is urged or biased by a right-turning spring (not shown). A hook member 4 for said closing member 3, which locks said arm 3a in a charging position, is rotatably supported on said base plate by a shaft 4a, and has an operating portion 4c extending downward with its bent portion 4b locking said arm 3a and being pressed or biased by right-turning spring (not shown).

A second base plate 5 supports the control mechanism which controls said hook members for said opening and closing member 1 and 3, respectively, supported on said base plate to operate said opening and closing blades, respectively, each supporting shaft of the various members to be described in detail hereinafter are monolithically molded from synthetic resin.

A cocking gear 6 is inserted onto a shaft 6a projecting on said second base plate 5 and during the charging operation, is made to turn to the left around the shaft 6a by a well known method not shown in the drawing.

On the upper and outer circumference of said cocking gear 6, a toothed wheel 6b is mounted in engagement with a pinion 7b, which is rigidly connected with a control cam 7. Said control cam 7 is supported by a shaft 7a, provided with a cam 7c on the right and outer circumference, a toothed wheel 7d on the left and outer circumference, a lower circular projection 7e on the upper part, a release projection on the lower part and a locking step 7g downward extending into the position shown and pressed by a left-turning spring (not shown).

A middle gear 8 is in engagement with said toothed wheel 7d of said control cam 7 and the gear 8 is connected monolithically with a toothed wheel 8a on the outer circumference and inserted onto said shaft 6a. A fly wheel 9 is supported by a shaft 9a projecting onto said second base plate and monolithically connected with a pinion 9b, which is in engagement with the toothed wheel 8a.

A release lever 10 is inserted onto said shaft 9a and locked in a locking step 7g of said control cam through its hook portion 10a and pressed by a left-turning spring (not shown).

A coil 11 is connected to an electronic circuit (not shown) and wound on a hollow winding frame 11a molded on said second base plate, a magnetizable iron core 11b being fixed in said frame 11a.

A magnetic control lever 12 is supported on a shaft 12a projecting onto said second base plate and has a magnetic portion 12b in opposition to said iron core 11b and a projection 12d in opposition to a pin 12c.

The tip of a pressing arm 12e extending downward to the right is in contact with said cam 7c of said control cam 7 and presses closely said magnetic portion 12b to said iron core 11b. An operating arm 12f extending upwards locks with operating portion 4c of said hook member 4 for the closing member 3 and the arm 12f is connected to a bent or stepped portion 12g located in a plane different from that of said pressing arm 12e.

Both the arms of said magnetic control lever 12 are monolithically molded from synthetic resin and pressed by a right-turning spring (not shown).

Said second base plate 5 is fixed and connected to said first one by means of a pipe or tubular portion 5a inserted in said shaft 4a as well as by a pipe or tubular portion 5b inserted in a column 13 disposed on said first base plate and also by a tip 5d of a lower projection 5c placed on the right upper part, a tip 5f of a projection 5e (refer to FIG. 2) extending under said shaft 12a and a tip 5h of another lower projection 5g placed on the left lower part, all of which tips are inserted in said first base plate to control and determine the predetermined alignment or fitting position of the two base plates. On the upper part, there is placed a reinforcing projection 5i and a projection 5j supporting said iron core 11b and a side wall 5k on the left side as well as side walls 5l and 5m on the right lower part which are provided for reinforcing said second base plate and preventing any scattering of lubricating oil.

Said side wall 5l is provided with a hole 5n for receiving therein said release lever 10. With flexible connecting portions 11c, 11d, 11e and 11f, said winding frame 11a is joined onto said base plate 5 for precise representation of said second base plate, FIG. 2 is a right side view of said second base plate shown in FIG. 1. Its operation is described in the following.

When in connection with the camera release operation the reflection of a single-lens reflex camera recedes from the condition shown in FIG. 1, said release lever 10 turns to the right against its biasing spring and said hook portion 10a releases said locking step 7g to permit said control cam 7 to start turning.

Before said control cam 7 starts turning, in general, power supply to the electronic circuit begins so that electric current flows in said coil 11 to magnetize said iron core 11b so that said magnetic portion 12b is kept attracted.

Pressed to turn to the left by a spring (not shown), said control cam 7 makes said pinion 7b, toothed wheels 7d and 8a engage respectively with said toothed wheel 6b of said cocking gear 6, toothed wheels 8 and 9b so that said cocking gear 6 and fly wheel 9 turn simultaneously and said cam 7 is delayed thereby to turn to the left.

Said control cam 7 acts so that said cam 7c releases said pressing arm 12e of said magnetic control lever 12 from its pressing contact and said projection 7e is therefore free to engage a starting contact member (not shown) for time-controlling the electronic circuit.

Though released from the pressing contact of its arm 12e, said magnetic control lever 12 maintains the condition shown in the drawing because said magnetic portion 12b is kept attracted to said iron core 11b.

At the final operation stage of said control cam 7, said release projection 7f engages with said operating arm 2c of said hook member 2 for said opening member 1 to make said member 2 turn to the right so that said hook portion 2b is unlocked from said bent portion 1a.

Unlocked from said bent portion 1a, said opening member 1 turns to the right around said shaft 1b by a spring (not shown) to operate said opening blades (also not shown), resulting in start of the exposure.

After a desired period elapses as determined by said electronic circuit said coil 11 is disconnected from the power supply to demagnetize said iron core 11b and to make the attractive force of said magnetic portion 12b disappear, so that said magnetic control lever 12 turns to the right by the action of its biasing spring (not shown). Since said cam 7c has already receded, said pressing arm 12e of said magnetic control lever 12 can turn to the right to press said operating arm 4c of said hook member 4 for said closing member 3 by the action of said operating arm 12f, resulting in unlocking of said bent portion 4c from said arm 3a.

When its arm 3a is unlocked, said closing member 3 turns to the right around said shaft 3b by means of a spring (not shown) to operate said closing blades (not shown), resulting in the completion of the exposure.

When the shutter is to be recharged, said opening and closing members 1 and 3, respectively, are made to turn to the left against respective springs with a cocking lever (not shown) by a well-known method so that said bent portion 1a and arm 3a are made to lock said hook portion 2b of said hook member 2 for said opening member 1 and said bent portion 4b of said hook member 4 for said closing member 3, respectively, and at the same time said cocking gear 6 is made to turn to the left against said spring of said control cam 7 so that said locking step 7g of said control 7 is made to lock said hook portion 10a of said release lever 10 and each member is thus displaced to the condition shown in FIG. 1 for the completion of the charging.

When said cam portion 7c of said control cam 7 pushes said pressing arm 12e of said magnetic control lever 12, said lever 12 turns to the left against its biasing spring (not shown), said magnetic portion 12b is closely pressed to said iron core 11b, which is made to recede while said flexible connecting portions 11c, 11d, 11e and 11f are resiliently deformed to some degree, so that said magnetic control lever 12 maintains a condition of close contact with the magnetic portion 12b.

While in the present embodiment the exposure is controlled with said opening and closing blades, it is possible to carry out the exposure operation with only one blade but this falls out of the scope of this invention.

It can thus be seen that since said second base plate is formed with synthetic resin, the starting contact member of said electronic circuit can be arbitrarily fitted within the operating range of said projection 7e and in addition the contact member can be directly fitted to said base plate 5 without any consideration of insulation, which has been necessary so far. Since the starting contact is well known, it is omitted from the drawing for the sake of clearness.

Since the supporting shaft of each member in the control mechanism is formed as one integral body onto said base plate, the shutter can make use of the superior lubricating property of synthetic resin, resulting in no cost for separate supporting shafts and for the combination of them and it is further possible to reduce the manufacturing cost and to decrease the space for the connecting portions so that the shutter can be made smaller.

Since in addition said winding frame 11a has a flexible connecting portion, a condition of close contact between said magnetic portion and said iron core can be surely maintained as mentioned above so that it is possible, in comparison with such an interlocking system with a separate spring, etc. as used so far in the art, to reduce the manufacturing cost due to a decrease in the number of parts and the required space and for this reason a less expensive and smaller shutter can be provided.

When said frame 11a is wound to make coil 11, both ends of said frame are deformed by the winding work to change the phase between said base plates at both the ends of said frame but, such a phase change can be absorbed by this connecting portion. When the pressing contact by the action of said control cam 7 is released, in addition, said spring of said magnetic control lever rapidly applies a force to said magnetic portion but this impact is alleviated because said connecting portion is bent to some degree and consequently said iron core follows said magnetic portion so that it becomes unnecessary to obtain force by using an excessively large electromagnet and also in this respect a size reduction is possible.

Although the biasing springs for said opening and closing members are not shown in FIG. 1, several turns of each torsion coil spring such as used usually in this type of focal plane shutter are wound around each of said shafts 1b and 3b.

On the right side of FIG. 1, an opening is formed on said first base plate and a receiving box for supporting the reflector of a single-lens reflex camera around said opening is arranged near the side wall of said second base plate.

Consequently, the reduction in size of said control mechanism, the principal object of this invention, is achieved for such a shutter and it, essential to this type of shutter that said shafts 1b and 3b are situated near said opening and at the same time the left side of these shafts is arranged near the body of the camera and the object can be attained by arranging each member in the region of limited interval between said shafts 1b and 3b and said receiving box without supporting there any member for operating said control mechanism. The most remarkable feature of this arrangement consists in the fact that said supporting portion of each member is formed as one integral body with said second base plate 5 to form said fitting portions 5a and 5b as well as guide portions 5d, 5f and 5h.

In this type of shutter, said control cam 7 and said magnetic control lever 12 of comparatively large volume are arranged, through said side walls 5k and 5l, on said second base plate while avoiding said shaft 1b.

On said second base plate 5 above said winding frame 11a of said coil, there are arranged, though not shown in the drawings, a control mechanism for controlling bulb or time photography and a switching member for selecting these operations.

Although in the disclosed embodiment all the operating members are supported on said shafts 6a, 7a, 9a and 12a, which are formed as one body on said second base plate, it is understood that the usual technical means and modifications of this invention can be made according to the application in question such as, for example, that a shaft formed on some operating member is supported in a hole suitably arranged on said second base plate, that guide portions are also used as fitting portions etc.

It can thus be seen that said second base plate is composed of synthetic resin into one body with the supporting portion and plane of each operating member as well as the connecting and guide portions and by virtue of such a construction, in comparison with any arrangement of their combination on a metallic base plate, the volume of the resulting assembly is reduced and two-dimensional and three-dimensional reinforcement of said base plate facilitated so that the size from the standpoint of arrangement can be reduced, each shaft can be better lubricated, the weight can be decreased and in addition since the side walls can be arbitrarily formed, one of them can shield the rays of light incident within the shutter from the side of said receiving box and at the same time it can also prevent effectively any scattering and adhesion of lubricating oil on said shutter blades in each portion of said control mechanism during shutter production.

What is claimed is:

1. In a camera shutter of the type having a pair of spaced apart base plates for supporting the shutter components; the improvement comprising at least one of said base plates being composed entirely of synthetic resin material and having a set of tubular portions extending toward and connected to the other of said base plates thereby connecting said base plates together and having a set of shafts turnably supporting thereon some of said shutter components, said tubular portions and said shafts being composed of synthetic resin material and comprising one integral body with said one base plate.

2. A camera shutter according to claim 1; wherein said one base plate includes a hollow winding frame and a plurality of flexible connecting portions flexibly connecting said hollow winding frame to said base plate, said hollow winding frame and connecting portions being composed of synthetic resin material and forming one integral body with said one base plate; and a coil wound around said hollow winding frame and an armature slidably inserted into the hollow of said hollow winding frame to thereby define an electromagnet as one of said shutter components supported by said base plates.

3. A camera shutter according to claim 1; further including a control lever turnably supported on one of the base plate shafts and a control cam turnably supported on another of the base plate shafts, and wherein said synthetic resin material possesses sufficient lubricating properties to lubricate said base plate shafts during use of the camera shutter.

4. A camera shutter according to claim 1; wherein said one base plate includes a hollow winding frame.

5. A camera shutter according to claim 1; wherein said one base plate includes a hollow winding frame and a plurality of flexible connecting portions flexibly connecting said hollow winding frame to said base plate, said hollow winding frame and connecting portions being composed of synthetic resin material and forming one integral body with said one base plate.

6. A camera shutter according to claim 5; further including a coil wound around said hollow winding frame, and an armature slidably inserted into the hollow of said hollow winding frame to thereby define an electromagnet as one of said shutter components supported by said base plates.

7. In a camera shutter of the type having a pair of spaced apart base plates for supporting the shutter components; the improvement comprising at least one of said base plates having projections extending therefrom toward the other of said base plates and connected thereto at predetermined positions thereby connecting said base plates together in a predetermined alignment and having shafts turnably supporting thereon some of said shutter components; said one base plate and projections and said shafts all being composed of synthetic resin material and jointly comprising one integral body.

8. A camera shutter according to claim 7; wherein said one base plate includes a hollow winding frame.

9. A camera shutter according to claim 7; wherein said one base plate includes a hollow winding frame and a plurality of flexible connecting portions flexibly connecting said hollow winding frame to said base plate, said hollow winding frame and connecting portions being composed of synthetic resin material and forming one integral body with said one base plate.

10. A camera shutter according to claim 9; including a coil wound around said hollow winding frame, and an armature slidably inserted into the hollow of said hollow winding frame to thereby define an electromagnet as one of said shutter components supported by said base plate.

* * * * *